United States Patent
Torii et al.

[11] Patent Number: 5,939,625
[45] Date of Patent: Aug. 17, 1999

[54] FAULT DIAGNOSIS METHOD AND APPARATUS FOR CONTROL SYSTEM

[75] Inventors: Kenji Torii; Mitsuhito Yamazaki; Hidetaka Ozawa; Masaki Ueyama, all of Saitama, Japan

[73] Assignee: Honda Giken Kogyo Kabushiki Kaisha, Tokyo, Japan

[21] Appl. No.: 08/873,600

[22] Filed: Jun. 12, 1997

[30] Foreign Application Priority Data

Jun. 13, 1996 [JP] Japan ..................................... 8-152309

[51] Int. Cl.⁶ ....................................................... G01M 7/00
[52] U.S. Cl. ..................................... 73/118.1; 267/140.11
[58] Field of Search ........................... 267/140.11, 140.12, 267/140.14, 140.15; 73/116, 118.1, 1.82, 669, DIG. 1

[56] References Cited

U.S. PATENT DOCUMENTS

| | | | |
|---|---|---|---|
| 4,973,031 | 11/1990 | Takano et al. | 267/140.14 |
| 5,145,024 | 9/1992 | Doi | 267/140.12 |
| 5,226,500 | 7/1993 | Doi et al. | 267/140.12 |
| 5,236,182 | 8/1993 | Aoki et al. | 267/140.12 |
| 5,427,347 | 6/1995 | Swanson et al. | 267/140.14 |
| 5,439,204 | 8/1995 | Yamazoe et al. | 267/140.14 |
| 5,628,499 | 5/1997 | Ikeda et al. | 267/140.14 |
| 5,647,579 | 7/1997 | Satoh | 267/140.14 |
| 5,690,321 | 11/1997 | Seni et al. | 267/140.14 |
| 5,779,231 | 7/1998 | Okazaki et al. | 267/140.14 |

FOREIGN PATENT DOCUMENTS

| | | |
|---|---|---|
| 59-79317 | 5/1984 | Japan . |
| 5-288237 | 11/1993 | Japan . |

*Primary Examiner*—Richard Chilcot
*Assistant Examiner*—Eric S. McCall
*Attorney, Agent, or Firm*—Lyon & Lyon LLP

[57] ABSTRACT

A fault diagnosis method and apparatus for a control system that includes a plurality of actuators and a plurality of sensors for controlling the operation of the actuators in accordance with the output signals of the sensors, wherein even in the case where a fault occurs in any of the actuators or any of the sensors constituting the nucleus of the system, the faulty point can be easily and inexpensively identified. In the fault diagnosis, the transmission characteristics between the individual actuators and the individual sensors are measured. On the basis of the measurements, a fault is decided on for all the transmission paths between the individual actuators and the individual sensors, thereby estimating a faulty point from the pattern of the fault decision of the transmission paths.

11 Claims, 11 Drawing Sheets

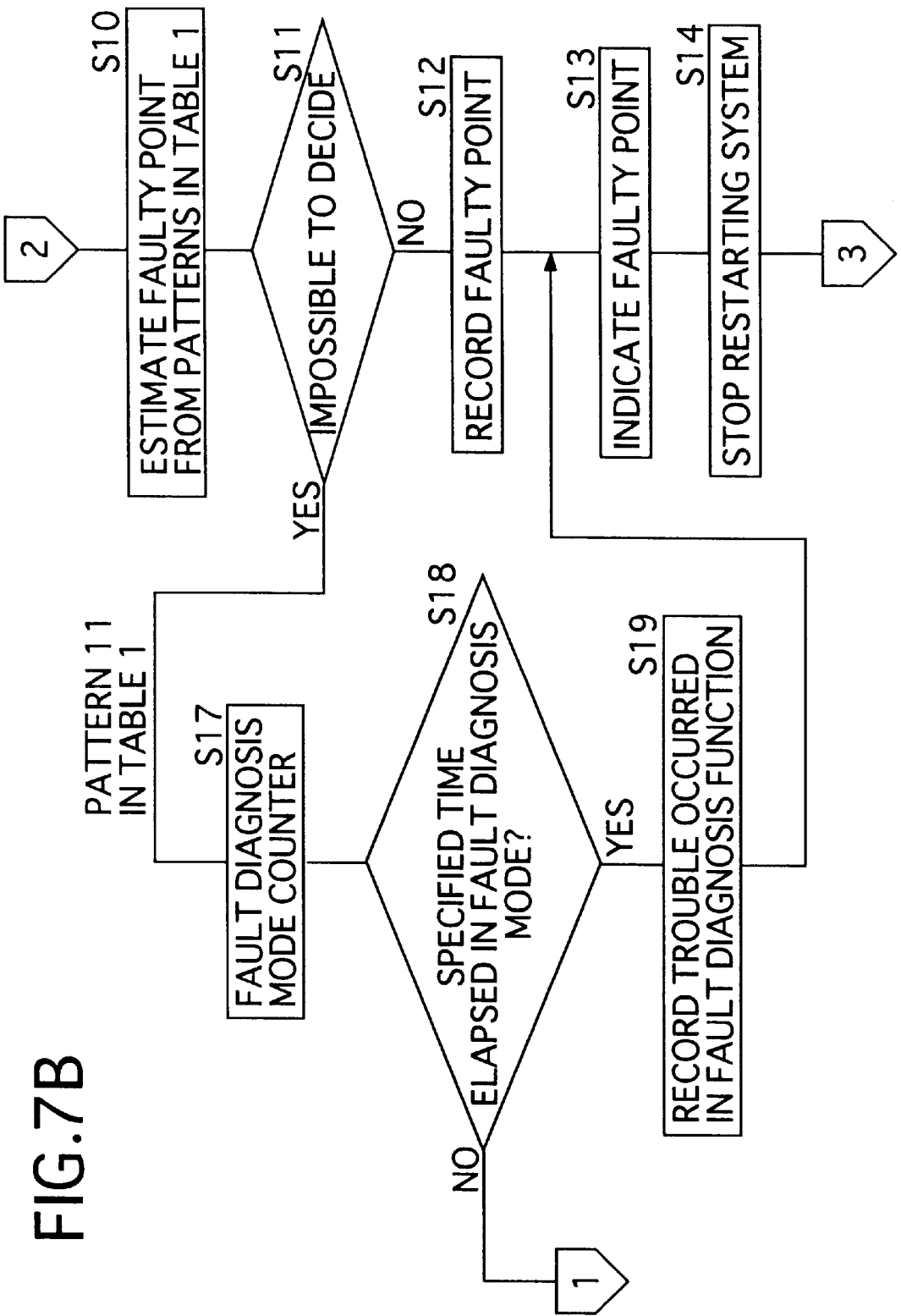

FAULT DIAGNOSIS METHOD AND APPARATUS FOR CONTROL SYSTEM

TECHNICAL FIELD OF THE INVENTION

The present invention relates to a method and an apparatus for fault diagnosis of a control system that comprises a plurality of actuators and a plurality of sensors in which the operation of the actuators is controlled in accordance with the output signals of the sensors.

BACKGROUND OF THE INVENTION

As such a control system, an active mount system for performing the control operation with an adaptive filter is well known (see JP-A-5-288237, for example), which comprises a plurality of active mounts for actively suppressing the vibrations exerted from the driving engine on the vehicle body, for example, using an actuator, and a plurality of error detection sensors installed at a plurality of the vehicle body portions for detecting the vibrations (error signals) due to the residual vehicle body vibration components. In this system, upon the occurrence of a fault or failure of a sensor or an actuator for some reason or other, the overall system is liable to operate abnormally. It is therefore desirable to provide some means for easily identifying a point of a fault which may occur in a sensor or an actuator.

In a conventional faulty vibration apparatus (see JP-A-59-79317, for example) of a control system for power plants in general, however, the only fault that can be identified is that of a sensor. For a fault of an actuator to be identified at the same time, it is necessary to provide a fault detection means for each actuator, thereby complicating the overall configuration and increasing the cost.

SUMMARY OF THE INVENTION

The present invention has been developed in view of these situations, and a first object thereof is to provide a method and an apparatus for fault diagnosis of a control system which can easily and inexpensively identify a faulty point of any of a plurality of actuators or sensors constituting a nucleus of the control system.

In such a control system, the transmission characteristic between individual actuators and individual sensors is liable to be affected by the variations caused by extended use and/or deterioration, the temperature environment of the system (especially, the temperature change of the mount itself for an active mount system), external disturbances, etc. Any diagnosis made that ignores the effects of these factors, therefore, would reduce the diagnosis accuracy correspondingly.

In view of this, a second object of the invention is to provide a fault diagnosis apparatus for a control system which can avoid the effects of the variations caused by extended use and/or deterioration, the temperature environment or external disturbances as far as possible.

In order to achieve the above-mentioned first object, according to the present invention, there is provided a control system comprising a plurality of actuators and a plurality of sensors in which the operation of the actuators is controlled in accordance with the output signals of the sensors, characterized in that the transmission characteristic value between the individual actuators and the individual sensors is measured, and a fault is decided on for all the transmission paths between the individual actuators and the individual sensors on the basis of the measurements so that a faulty point is estimated from the pattern of the result of fault decision for the transmission paths.

The present invention, on the other hand, also provides a control system comprising a plurality of actuators and a plurality of sensors for controlling the operation of a plurality of the actuators in accordance with the output signals of the sensors, characterized by further comprising measurement means for measuring the transmission characteristic between individual actuators and individual sensors, and decision means for deciding on a fault for all of the transmission paths between the individual actuators and the individual sensors, and estimation means for estimating a faulty point from the pattern of the result of fault decision on the transmission paths.

In order to achieve the first and second objects described above, the invention is characterized in that the decision means compares the measurement with the normal value of the transmission characteristic and decides on a fault based on the error between them, and updates said normal value in subsequent fault decisions on the basis of the measurement decided to be normal by the preceding fault decision. Further, the invention is characterized in that said control system comprises a plurality of active motor mounts for actively reducing the vibrations exerted from the engine on the vehicle body using an actuator and a plurality of error sensors installed at a plurality of vehicle body portions and capable of detecting the vehicle body vibrations, the estimation means being adapted to estimate a faulty point when the active motor mounts are in a sufficiently warmed state. Furthermore, the invention is characterized in that said control system comprises a plurality of active motor mounts for actively reducing the vibrations exerted from the engine on the vehicle body using an actuator and a plurality of error sensors installed at a plurality of vehicle body portions and capable of detecting the vehicle body vibrations, said estimation means being adapted to estimate a faulty point when the engine or the vehicle is in a stationary state.

Other and more detailed objects and advantages of the present invention will appear to those skilled in the art from the following description of preferred embodiments and the accompanying drawings.

BRIEF DESCRIPTION OF THE DRAWINGS

FIGS. 5A and 5B are graphs showing the transmission characteristic in the vibration transmission path from one actuator to one error detection sensor, as measured at two different time points under normal system conditions, in which FIG. 5A represents the phase-versus-frequency characteristic and FIG. 5B represents the amplitude-versus-frequency characteristic;

FIGS. 6A and 6B are graphs showing the transmission characteristic in the vibration transmission path from one actuator to one error detection sensor as measured under normal and abnormal system conditions, in which FIG. 6A represents the phase-versus-frequency characteristic and FIG. 6B represents the amplitude-versus-frequency characteristic;

FIGS. 7A and 7B comprise a flowchart showing the steps of fault diagnosis made immediately after engine stop;

DETAILED DESCRIPTION OF PREFERRED EMBODIMENTS OF THE INVENTION

Figure 1:
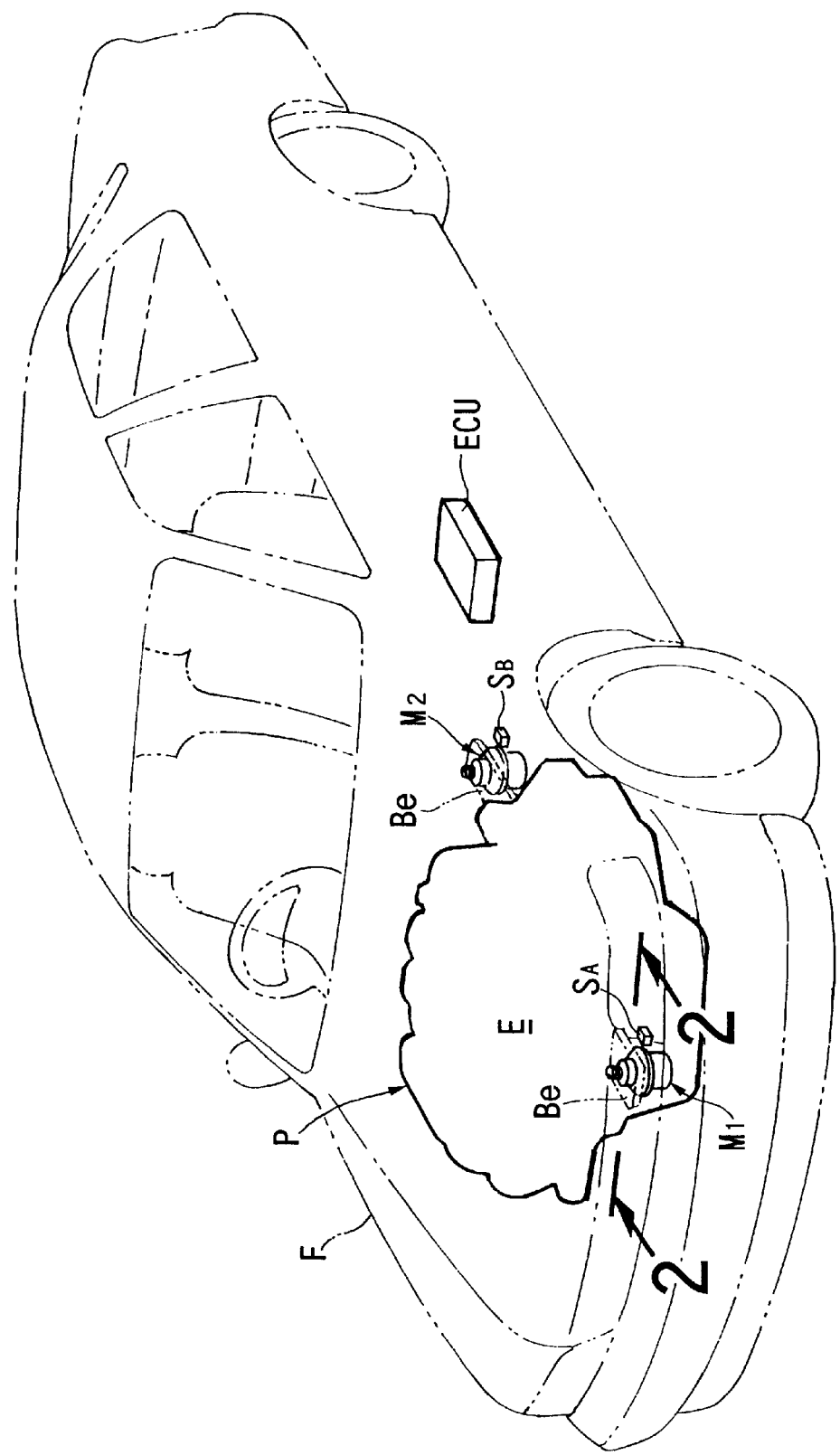
FIG. 1 is a schematic diagram showing a general configuration of an example of an active mount system of an automobile.
Figure 2:
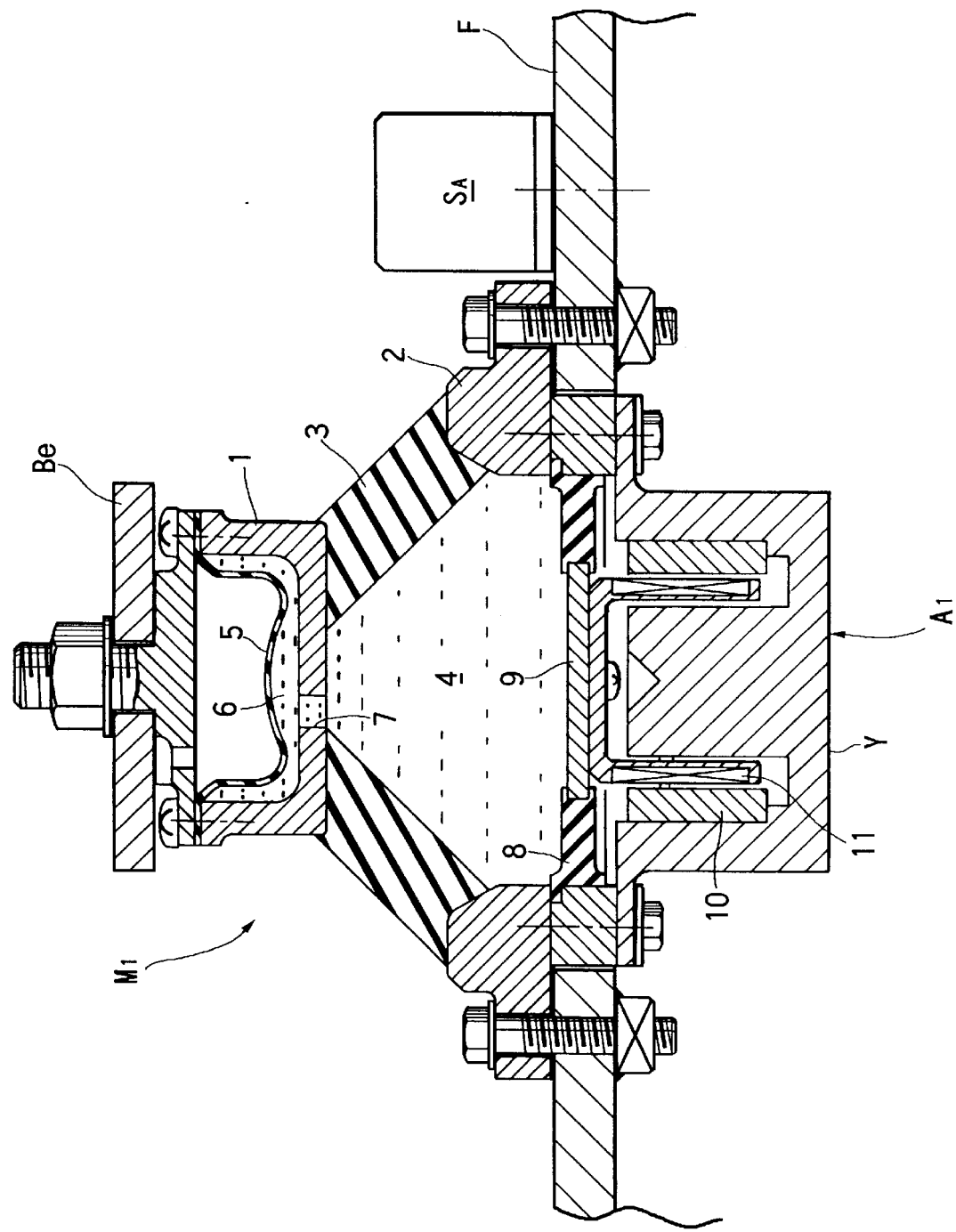
FIG. 2 is an enlarged sectional view taken on the line 2—2 in FIG. 1 of an active motor mount.

The present invention will be specifically explained below with reference to embodiment of the invention illustrated in the accompanying drawings. These embodiments represent an example of the control system according to the invention embodied in an automotive active mount system (commonly referred to as a motor mount system although the "mounts" also serve to support the transmission that is attached to the engine).

First, an automotive active mount system according to the present invention will be briefly explained with reference to FIGS. 1 to 4. This system comprises a plurality of active mounts $M_1$, $M_2$ for actively reducing and controlling the vibrations transmitted from an engine E to a vehicle body F using actuators $A_1$, $A_2$, and a plurality of error detection sensors $S_A$, $S_B$ installed at strategic points of the vehicle body. The error detection sensors $S_A$, $S_B$ are so configured as to be able to detect the vehicle body vibrations due to the residual vibration components after the vibrations (vibrations to be controlled) generated by the vehicle body F attributable to the driving of the engine E are offset by the vibrations generated by the actuators $A_1$, $A_2$ of the active mounts $M_1$, $M_2$. Acceleration sensors are used as such error detection sensors.

The active mounts $M_1$, $M_2$ (commonly referred to as motor mounts) constitute at least a part (longitudinally-arranged two in the shown example) of a plurality of vibration-proof mounts longitudinally and transversely interposed in parallel in spaced relation with each other between a power unit P including the engine E and the vehicle body F in order to support the power unit P in the front portion of the vehicle body F. An example of this structure, though well known, will be briefly explained with reference to FIG. 2. The active mounts $M_1$, $M_2$ each include a pair of mounting portions 1, 2 and a hollow elastic support member 3 made of stiff rubber for elastically coupling the mounting portions. The mounting portion 1 is screwed to an engine bracket Be protruded from the power unit P, and the other mounting portion 2 is screwed to the vehicle body F. In the shown example, a longitudinally spaced pair of error detection sensors $S_A$, $S_B$ are mounted on the vehicle body F in the neighborhood of the mounting portion 2 on the vehicle body side of the active mounts $M_1$, $M_2$.

The elastic support member 3 has defined therein a fluid chamber 4 for sealing a non-compressible fluid. One of the open ends of the fluid chamber 4 communicates through an orifice 7 with an auxiliary fluid chamber 6 covered by an elastic film 5 arranged in one of the mounting portion 1. The outer surface of the elastic film 5 is left open to the atmospheric pressure. The other open end of the fluid chamber 4 is fluid-tightly enclosed by a vibration plate 9 supported on the mounting portion 2 through an annular diaphragm 8. In order to forcibly vibrate the vibration plate 9, the actuator $A_1$ ($A_2$) is mounted on the mounting portion 2. An example of the actuator is an electromagnetic actuator of what is called the VCM (voice coil motor) type, as shown, in which a permanent magnet 10 is fixed on a yoke Y and a movable voice coil for generating a force proportional to the applied current is used as a drive coil 11 to which the vibration plate 9 is coupled.

Figure 3:
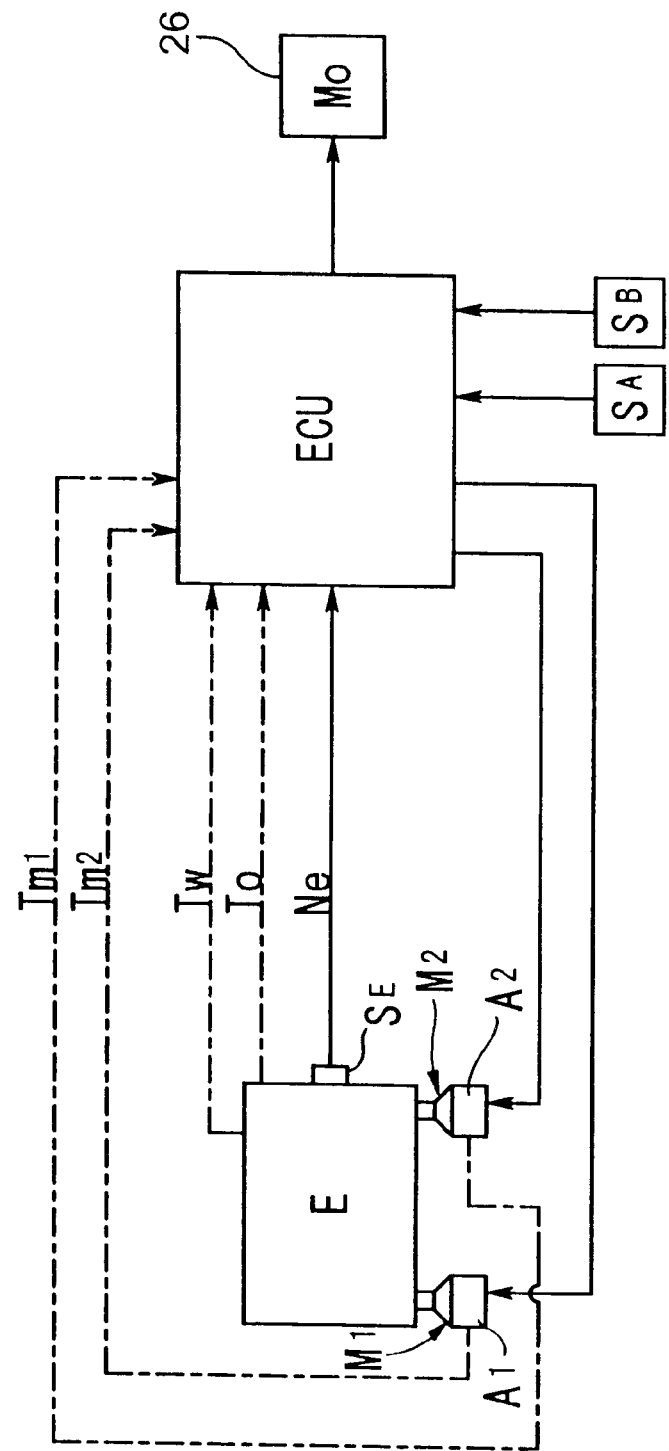
FIG. 3 is a control block diagram of the active motor mount system.

As shown in the block diagram of FIG. 3, the electronic control unit ECU arranged at a strategic point of the vehicle body is connected to the actuators $A_1$, $A_2$, the error detection sensors $S_A$, $S_B$ and an engine speed sensor $S_E$ including a crank angle sensor, for example, for producing a signal corresponding to the rpm of the engine E. The actuators $A_1$, $A_2$ that have received a drive signal from the control unit ECU generate an electromagnetic force corresponding to the signal and vibrate the vibration plate 9, whereby the internal pressure of the fluid chamber 4 is changed to variably control the anti-vibration characteristic of the mount thereby to actively control the vibratory noises of the vehicle.

Figure 4:
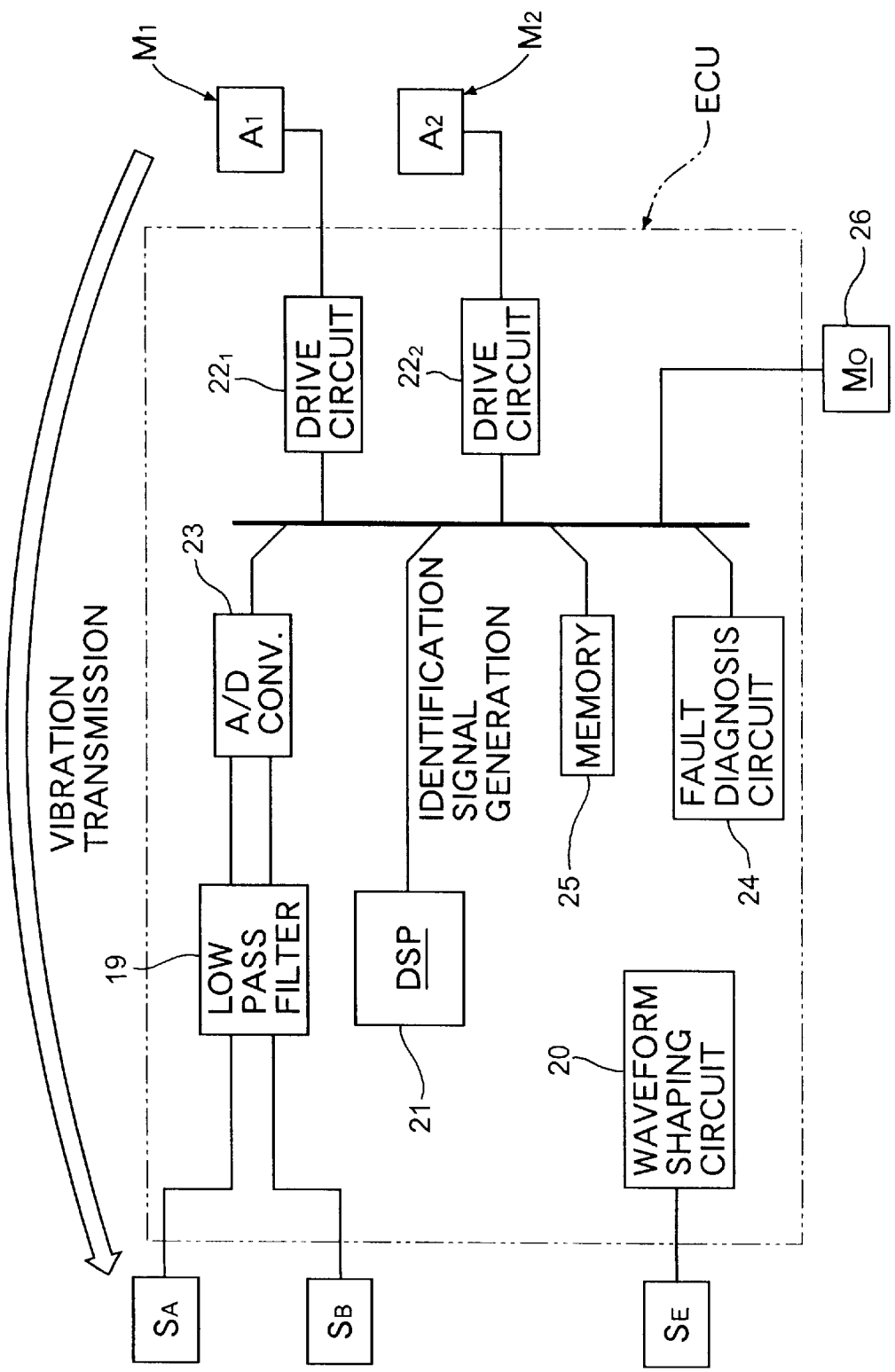
FIG. 4 is a block diagram schematically showing an electronic control unit.

The electronic control unit ECU, adopting the concept of vibration number of order, is adapted to reduce the vibratory noises effectively by adaptive control of the vibrations of the engine E by dividing the vibrations into the vibration components (primary vibration components) of the piston system generated by the regular vibratory noise characteristic in synchronism with the rotation of the engine E and the vibration components (secondary vibration components) of the detonation pressure generated by the irregular vibratory noise characteristic in accordance with the combustion state. For this purpose, as shown in FIG. 4, the electronic control unit ECU has main component parts including a waveform shaping circuit 20 for shaping the waveform of the output signal of the engine speed sensor $S_E$ and producing a timing pulse signal indicating the vibratory noise period corresponding to each component part of the engine, a processor DSP 21 (digital signal processor) capable of high-speed calculation for adaptive control based on the timing pulse signal, a drive circuit $22_1$, $22_2$ for converting and amplifying the actuator control signal produced from the processor DSP into a drive signal for the actuators $A_1$, $A_2$, and an A/D converter 23 for converting the error signal output from the error detection sensors $S_A$, $S_B$ through a low pass filter 19 into a digital signal and feeding back the digital signal to the processor DSP. Further, the electronic control unit ECU incorporates a fault diagnosis circuit 24 for executing the fault diagnosis process described later.

The processor DSP 21 incorporates a plurality of adaptive control processing units having the circuit function for adaptive control in accordance with the period of generation of each timing pulse signal based on the data of the transmission characteristic measured (identified) in advance for the vibration transmission paths between the actuators $A_1$, $A_2$ and the error detection sensors $S_A$, $S_B$, and the circuit function capable of identifying the particular transmission characteristics and updating the identified data as need arises. An ID reference signal stored in a memory 25 in the electronic control unit ECU and described later is adapted to be applied to the adaptive control processing units under predetermined conditions at a predetermined timing. Said adaptive control by the processor DSP makes possible the optimization (i.e., active vibration control) of the drive output of the actuators $A_1$, $A_2$ in such a manner that a vibratory force of opposite phase to the order of vibration of the engine is generated in the actuators $A_1$, $A_2$ and thus the transmission of the vibrations from the engine to the vehicle body is cut off thereby to converge the output signal (error signal) of the error detection sensors $S_A$, $S_B$ to a minimum value. This technique of adaptive control of the active mounts is variously known in the prior art (see JP-A-7-271451, for example).

As shown by chain lines in the block diagram of FIG. 3, the electronic control unit ECU can be connected with various sensors for detecting other physical quantities corresponding to the operating conditions or the operating environment of the engine E or the vehicle as required. The detection signals (signals To, Tw, $T_{M1}$, $T_{M2}$ corresponding to the oil temperature, water temperature and the mount temperature in the shown example) from such sensors can be added as control factors for fault diagnosis by the electronic control unit ECU.

The data on the system transmission characteristic, i.e., the data on the vibration transmission characteristic from the electric input terminals of the actuators $A_1$, $A_2$ to the electric output terminals of the error detection sensors $S_A$, $S_B$ are stored and accumulated in the processor DSP 21 in advance by a predetermined measurement (identification) process. The adaptive control processing unit of the processor DSP regulates and controls the actuator control signals (hence, the control outputs of the active mounts $M_1$, $M_2$) to an optimum value by adaptive control using the stored data.

Also, said transmission characteristic is affected by the change in the temperature environment, the variations caused by extended use and/or deterioration, etc. of the system. Once the identification data of the transmission characteristic is fixed, therefore, the system cannot be controlled with high accuracy conforming to the above-mentioned changes or variations. For the time being, therefore, let us specifically explain below the principle of fault diagnosis using the "transmission characteristic" ignoring such changes and variations.

Figure 5A:
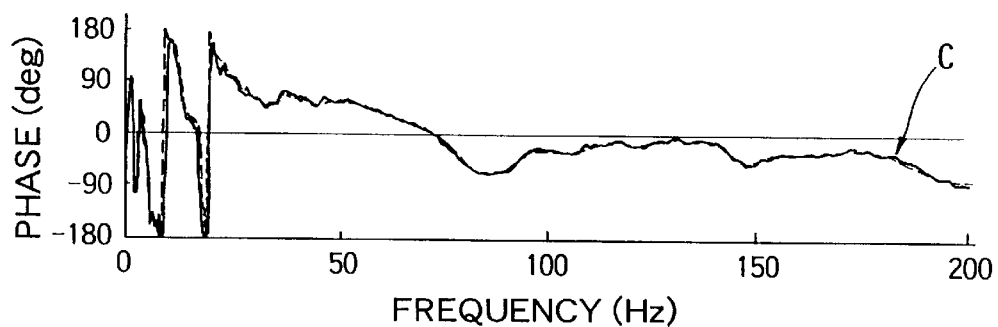
Figure 5B:
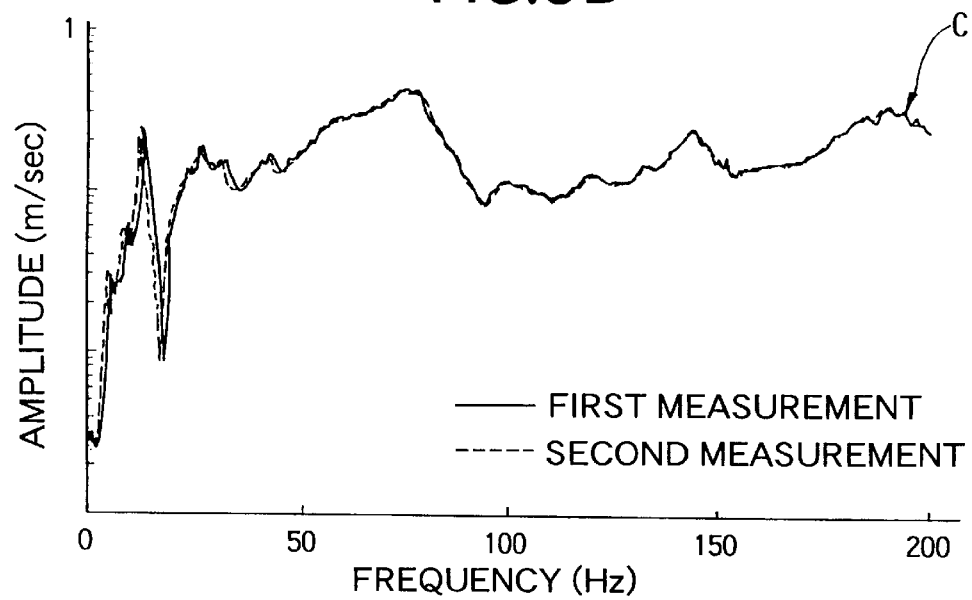
Figure 6A:
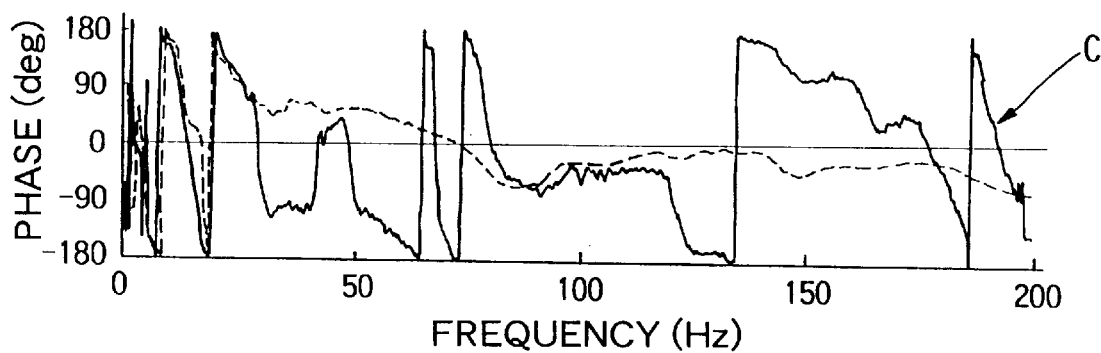
Figure 6B:
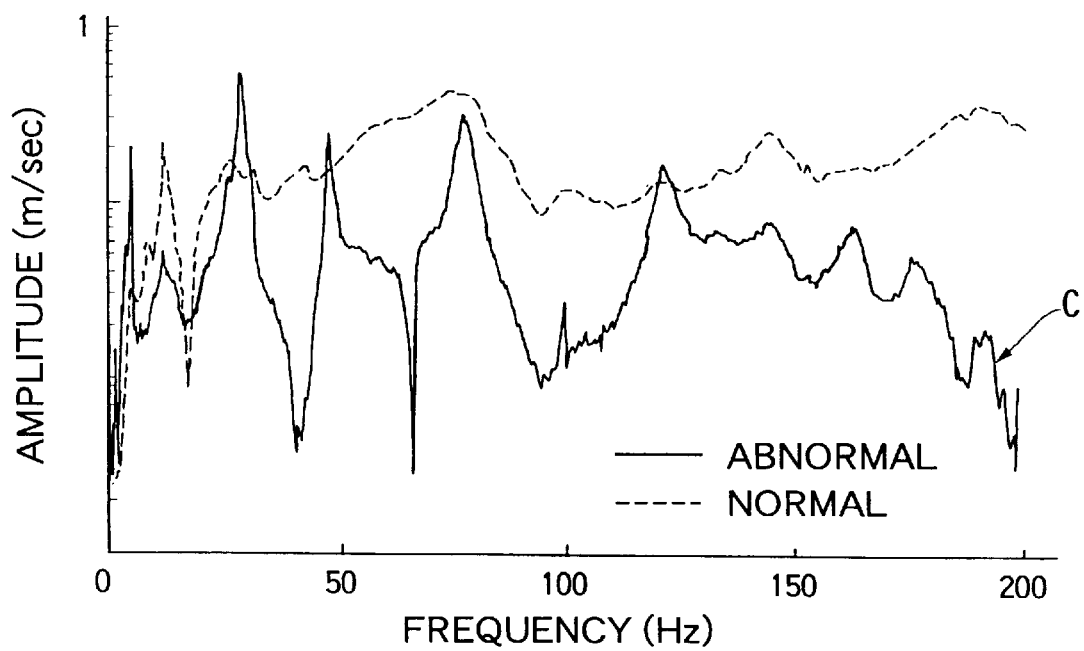

FIGS. 5A and 5B show the case in which the characteristic C of vibration transmission from the electric input terminal of the actuator of a given active mount to the electric output terminal of a given error detection sensor is measured twice at appropriate time intervals. In this diagram, the transmission characteristic C is expressed by the frequency characteristic with respect to both the amplitude and the phase. The measurement of the transmission characteristic C is always substantially the same as the one shown in FIGS. 5A and 5B in the absence of a fault in the parts of the system as long as the voltage applied to the electric input terminal of the actuator remains constant. In the case where a fault occurs in the error detection sensor or the actuator, on the other hand, the transmission characteristic C undergoes a change as shown in FIGS. 6A and 6B. In other words, FIGS. 6A and 6B represent a comparison between the case in which all the parts of the system are normal and the case in which the error detection sensor develops a fault, i.e. is abnormal. As is obvious from this diagram, in the case where the error detection sensor is faulty, the transmission characteristic C changes, and, in both the amplitude and phase thereof, never coincide with those under normal conditions. The same can be said of a fault that may develop in the actuator.

If after the transmission characteristic C of a transmission path between an actuator and an error detection sensor is measured and the measurement is compared and fails to coincide with a value under normal conditions in at least one of amplitude and phase, it can therefore be decided that a fault has occurred in some part of the particular transmission path. Assume, for example, that a signal of a predetermined frequency and a predetermined voltage is applied to an actuator, the transmission characteristic C of the transmission path between the particular actuator and an error detection sensor is measured, and the measurement is compared with a normal value. If the difference is not more than an error tolerance for both phase and amplitude, then the particular path can be determined to be normal. Otherwise, it can be decided to be abnormal.

Now, also with reference to the flowchart of FIG. 7, explanation will be made about a specific example of fault diagnosis as applied to a system (1-2-2 system) like the shown active mount system including one reference signal (identification signal), two actuators and two error detection sensors.

In this specific example, in order to eliminate the effect of the disturbances, it is assumed that fault diagnosis is carried out immediately after the engine stops (step S1). Immediately after the engine comes to stop, the active mount is still in fully-warmed state and can be assumed to have a substantially predetermined temperature. Conveniently, therefore, it is not necessary to take the effect of temperature changes into consideration. In the case where the engine has been operated only for a very short length of time before it comes to stop, however, the active mount may not be fully warmed and therefore the fault diagnosis is not carried out (step S2). Instead of this method of fault diagnosis by ascertaining that the active mount is fully warmed from the engine operation time as described above, the engine water temperature Tw or the oil temperature To can be monitored so that when they rise beyond a predetermined temperature, it can be assumed that the active mount is fully warmed and the fault decision is carried out. As another alternative, the mount temperatures $T_{M1}$ and $T_{M2}$ are directly measured, and only in the case where these temperatures are included within a range capable of fault diagnosis, i.e., only in the case where they are in a temperature range where the active mount is decided to have been fully warmed, the fault diagnosis is started (step S3) and carried out (see the chain lines in the block diagram of FIG. 3).

While the engine is running, noises due to the external disturbances including the vibrations of the engine, the transmission, the undercarriage and the like other than the vibrations transmitted from the actuators $A_1$, $A_2$ are superimposed on the error detection sensors $S_A$, $S_B$. An attempt to measure the transmission characteristic C in an ordinary way, therefore, might involve an error component due to the effects of these external disturbances, thereby often resulting in an erroneous diagnosis. In order to solve this problem, the shown example in which a fault diagnosis is carried out only when the engine is in stationary state can be replaced by a technique in which the effect of noises due to external disturbances is minimized by carrying out a fault diagnosis only when the vehicle is stationary or only when both the engine and the vehicle are in stationary state.

The transmission characteristic C can be measured, i.e., can be identified in several frequency bands. For simplifying the process, however, a single frequency (steps S4 and S6) is used (selection of 80 Hz, for example, at which the effect of noises is considered small that makes it more difficult to pick up the noises of the vehicle body vibrations than at lower frequencies and more difficult to pick up high-frequency noises of a power supply or the like than at higher frequencies). Also, a voltage of a predetermined value, say, 1V, is applied to each actuator (steps S4 and S6).

Assuming that the identified value (measurement) of the transmission characteristic measured (step S5 and S7) for each actuator is C and the identified value under normal conditions (the reference value described later) used for comparison is D, then these two values are compared (step S8) and the difference between them for each of the amplitude and the phase is calculated (step S9).

Amplitude difference $\epsilon_{abs}$=(absC−absD)

Phase difference $\epsilon_{angle}$=(angleC−angleD)

In the case where one of these differences is larger than a tolerable error (based on the detected error or the like), a fault is decided. In other words, assuming that the tolerable errors of amplitude and phase are $\zeta_{abs}$ and $\zeta_{angle}$, respectively, a particular transmission path is decided to be abnormal when the relation holds that $|\epsilon_{abs}|>\zeta_{abs}$ for the amplitude, and when the relation holds that $|\epsilon_{angle}|>\zeta_{angle}$ for the phase (steps S8, S9).

The identification of a faulty point is facilitated by carrying out this method at a specific frequency corresponding to the fault mode of the actuator mount. For example, (1) the air entering the mount which seals a liquid reduces the sensitivity over the whole frequency ranges, and (2) the cracking of the rubber in the movable portion of the mount reduces the sensitivity at a frequency of about 160 Hz. The apparatus therefore can be configured to distinguish between (1) and (2) above by identifying 80 Hz and 160 Hz.

Figure 8:
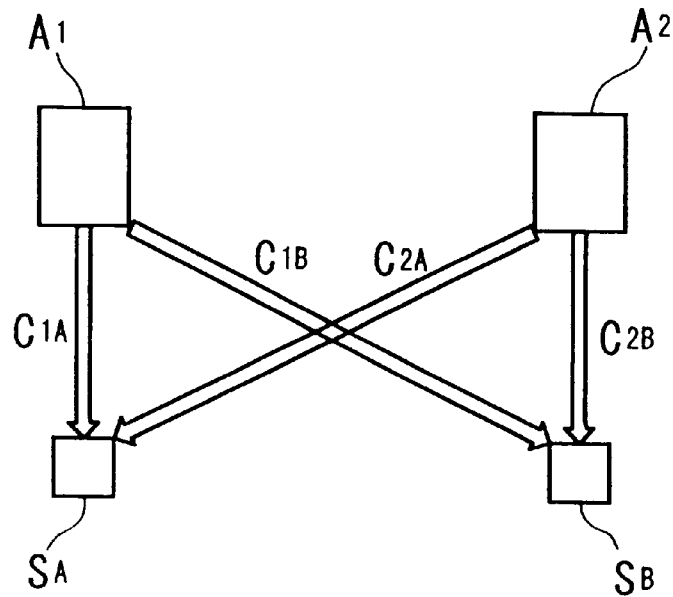
FIG. 8 is a schematic diagram for visually explaining the vibration transmission paths of a 1-2-2 system.
Figure 9:
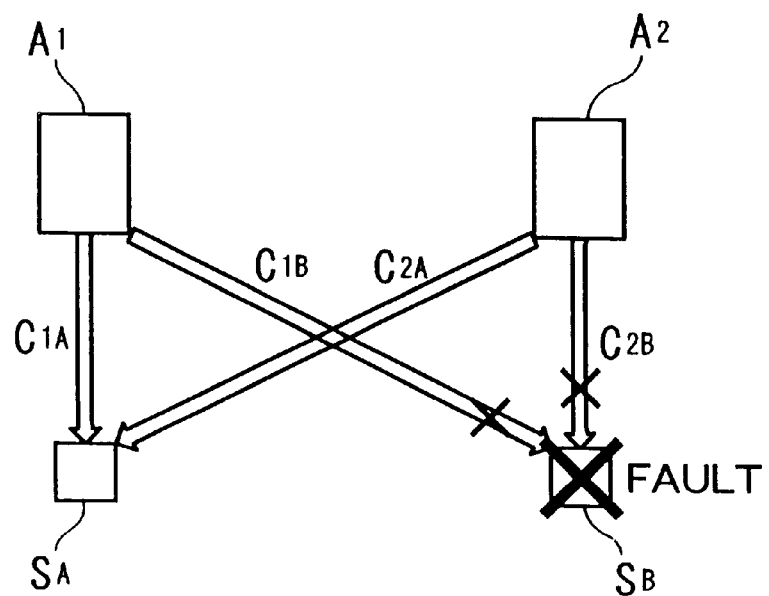
FIG. 9 is a diagram for visually explaining the faulty condition of the sensor $S_B$ in the vibration transmission path of a 1-2-2 system.

Now, with the active mount system (1-2-2 system) illustrated in FIG. 3, as schematically shown in FIG. 8, there exists a total of four vibration transmission paths (identified paths) $C_{1A}$, $C_{1B}$, $C_{2A}$, $C_{2B}$ directed from each of the two actuators $A_1$, $A_2$ to the two error detection sensors $S_A$, $S_B$. Suppose that a fault has occurred in the error detection sensor $S_B$. As indicated by marks X in FIG. 9, only the paths $C_{1B}$, $C_{2B}$ associated with the error detection sensor $S_B$ among all the paths $C_{1A}$, $C_{1B}$, $C_{2A}$, $C_{2B}$ are decided to be faulty, while the paths $C_{1A}$, $C_{2A}$ not associated with the error detection sensor $S_B$ are decided to be normal. A similar phenomenon appears also when a fault occurs in the other error detection sensor $S_A$ or the actuators $A_1$, $A_2$. These situations are summarized in Table 1 for faulty point estimation (incidentally, the above-mentioned fault shown in FIG. 9 corresponds to Pattern 5).

TABLE 1

Faulty point estimation table (1-2-2 system)

| Transmission path | $C_{1A}$ | $C_{1B}$ | $C_{2A}$ | $C_{2B}$ | Condition |
|---|---|---|---|---|---|
| PATTERN 1 | o | o | o | o | All normal |
| PATTERN 2 | x | x | o | o | $A_1$ faulty |
| PATTERN 3 | o | o | x | x | $A_2$ faulty |
| PATTERN 4 | x | o | x | o | $S_A$ faulty |
| PATTERN 5 | o | x | o | x | $S_B$ faulty |
| PATTERN 6 | x | x | x | o | Both $A_1$ and $S_A$ faulty |
| PATTERN 7 | x | x | o | x | Both $A_1$ and $S_B$ faulty |
| PATTERN 8 | x | o | x | x | Both $A_2$ and $S_A$ faulty |
| PATTERN 9 | o | x | x | x | Both $A_2$ and $S_B$ faulty |
| PATTERN 10 | x | x | x | x | At least $A_1$, $A_2$, $S_A$, $S_B$ faulty |
| PATTERN 11 | Other than Patterns 1 to 10 | | | | Probable detection error (rediagnose) | o . . . Normal
x . . . Faulty

The transmission characteristic of each of the transmission paths $C_{1A}$, $C_{1B}$, $C_{2A}$, $C_{2B}$ is measured in this way (steps S5, S7) and compared with the respective normal values (step S8), so that a fault decision is made (step S9) for all of the transmission paths $C_{1A}$, $C_{1B}$, $C_{2A}$, $C_{2B}$. Then, a specific actuator $A_1$ or $A_2$ or a specific error detection sensor $S_A$ or $S_B$ which is in trouble can be easily and accurately determined as shown in the Table 1 from the pattern of the fault decision of the transmission paths $C_{1A}$, $C_{1B}$, $C_{2A}$, $C_{2B}$ (steps S10, S11).

The normal value (i.e., the reference value D) of the transmission characteristic to be compared (step 8) with the measurement of the transmission characteristic in fault diagnosis undergoes delicate changes with the progress of variations caused by extended use and/or deterioration of the active mounts, the vehicle body or other parts. Once the reference value D is fixed, therefore, an erroneous diagnosis may result. In order to avoid the effect of such variations, the measurement C of the transmission characteristic associated with the decision that all the transmission characteristics are normal in the shown case of fault diagnosis (i.e., the decision that Pattern 1 is involved in Table 1 above) is stored and used as a normal value (i.e., a reference value D) of the transmission characteristic for the next fault diagnosis. As a result, the normal value (i.e., the reference value D) of the transmission characteristic to be compared is always updated to the latest value (steps S15, S16). In this way, the erroneous diagnosis which otherwise might be caused by the variations caused by extended use and/or deterioration is effectively avoided. If the reference value D is updated in such a manner that the N measurements $C_1$ to $C_N$ of the transmission characteristics previously decided as normal are stored after the respective fault diagnoses and the average value $(\Sigma C_i)/N$ thereof is used as a reference value D for the next fault diagnosis, then the effect of the variations in the measurement error can be minimized.

In this way, in the case where any one of the actuators $A_1$, $A_2$ and/or the error detection sensors $S_A$, $S_B$ is determined to be faulty, the electronic control unit ECU records a faulty point (step S12), and the faulty point is specifically notified to the driver on a fault display means Mo 26 connected to the unit ECU (step S13). Thus the proper countermeasure can be taken rapidly for replacement or repair. At the same time, the subsequent restarting of the active mounts is stopped (step S14) thereby preventing the reoccurrence of the trouble in the system.

Figure 7A:
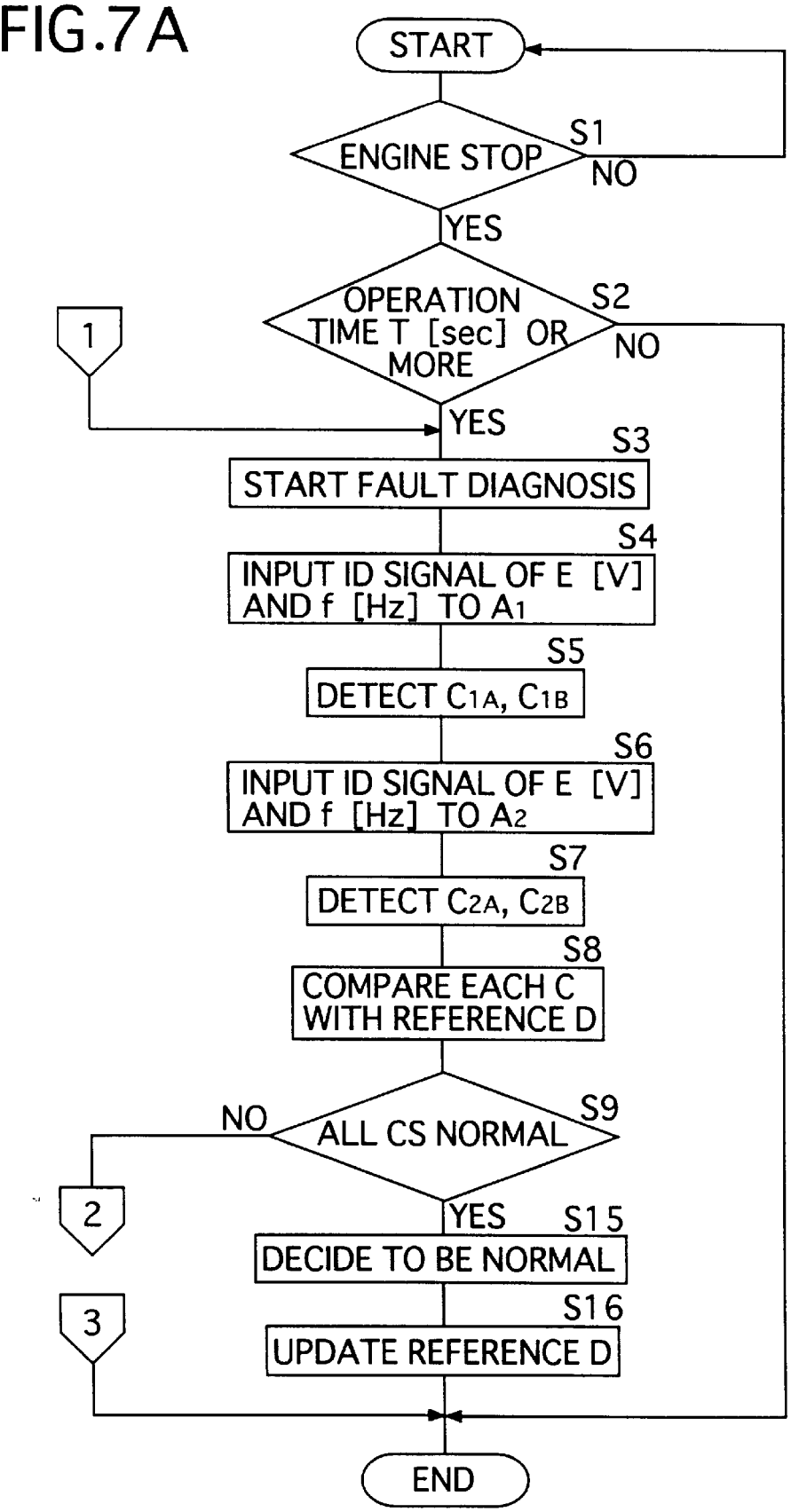

Now, explanation will be made of a specific example of the steps of fault diagnosis based on the flowchart of FIGS. 7A and 7B. First, once step S1 decides that the engine E stops running, step S2 decides whether or not the time for which the engine had run before the stop is longer than a predetermined time length T. If the answer is NO, the fault diagnosis is not carried out, while if the answer is YES, the fault diagnosis is started (step S3). As a result, in the electronic control unit ECU, first, an identification signal of E volts and f Hz is applied to the processor DSP 21 in order to drive the actuator $A_1$ (step S4). The error signals output from the error detection sensors $S_A$, $S_B$ in response to this are received, and the transmission characteristics of the transmission paths $C_{1A}$, $C_{1B}$ to each of the error detection sensors $S_A$, $S_B$ from the actuator $A_1$ are detected (step S5). Then, in order to drive the other actuator $A_2$, the identification signal of E volts and f Hz is applied to the processor DSP (step S6), and the signals output from the error detection sensors $S_A$, $S_B$ accordingly are received thereby to detect the transmission characteristics of the transmission paths $C_{2A}$, $C_{2B}$ from the actuator $A_2$ to each of the error detection sensors $S_A$, $S_B$ (step S7).

Then, step S8 compares the transmission characteristics of the transmission paths $C_{1A}$, $C_{1B}$, $C_{2A}$, $C_{2B}$ with the transmission characteristics (i.e., the reference values D) for the normal conditions, respectively. In the case where the decision at step S9 is that all the transmission characteristics are not normal, a specific faulty point is estimated from the fault pattern described in the above estimation Table 1 (step S10). Then, in the case where step S11 decides that a faulty point can be determined, the electronic control unit ECU records the faulty point (step S12), and then the faulty point is specifically indicated to the driver on the fault display means Mo 26 (step S13). Further, the subsequent restarting of the active mount system is prohibited (step S14), thereby preventing the reoccurrence of the trouble in the system.

In the case where step S9 decides that the transmission characteristics of all the transmission paths $C_{1A}$, $C_{1B}$, $C_{2A}$, $C_{2B}$ are normal, on the other hand, the whole system is decided as normal (step S15), and the reference value D, i.e., the normal value is updated using the particular transmission characteristic that has been decided as normal. In the case where the decision in step S11 is that a faulty point cannot be determined, by contrast, (in the case of Pattern 11 in the estimation Table 1), step S17 counts the fault diagnosis mode, and further step S18 decides whether the fault diagnosis mode has passed a specified time length. Unless the specified time has elapsed, the process returns to step S3 for restarting the fault diagnosis. In the case where the decision is that the specified time has passed, on the other hand, the electronic control unit ECU records that a trouble has occurred in the fault diagnosis function (step S19), followed by step S13 for informing the driver of the prevailing situation.

In the above-mentioned embodiments, the electronic control unit ECU corresponds to measurement means for measuring the transmission characteristics between the individual actuators $A_1$, $A_2$ and the individual error detection sensors $S_A$, $S_B$ in cooperation with the particular actuators $A_1$, $A_2$ and the error detection sensors $S_A$, $S_B$, and estimation means for deciding on a fault for all of the transmission paths $C_{1A}$, $C_{1B}$, $C_{2A}$, $C_{2B}$ between the individual actuators $A_1$, $A_2$ and the individual error detection sensors $S_A$, $S_B$ based on the measurements of the transmission characteristics and estimating a faulty point from the patterns of the fault decision of the transmission paths $C_{1A}$, $C_{1B}$, $C_{2A}$, $C_{2B}$.

Figure 10A:
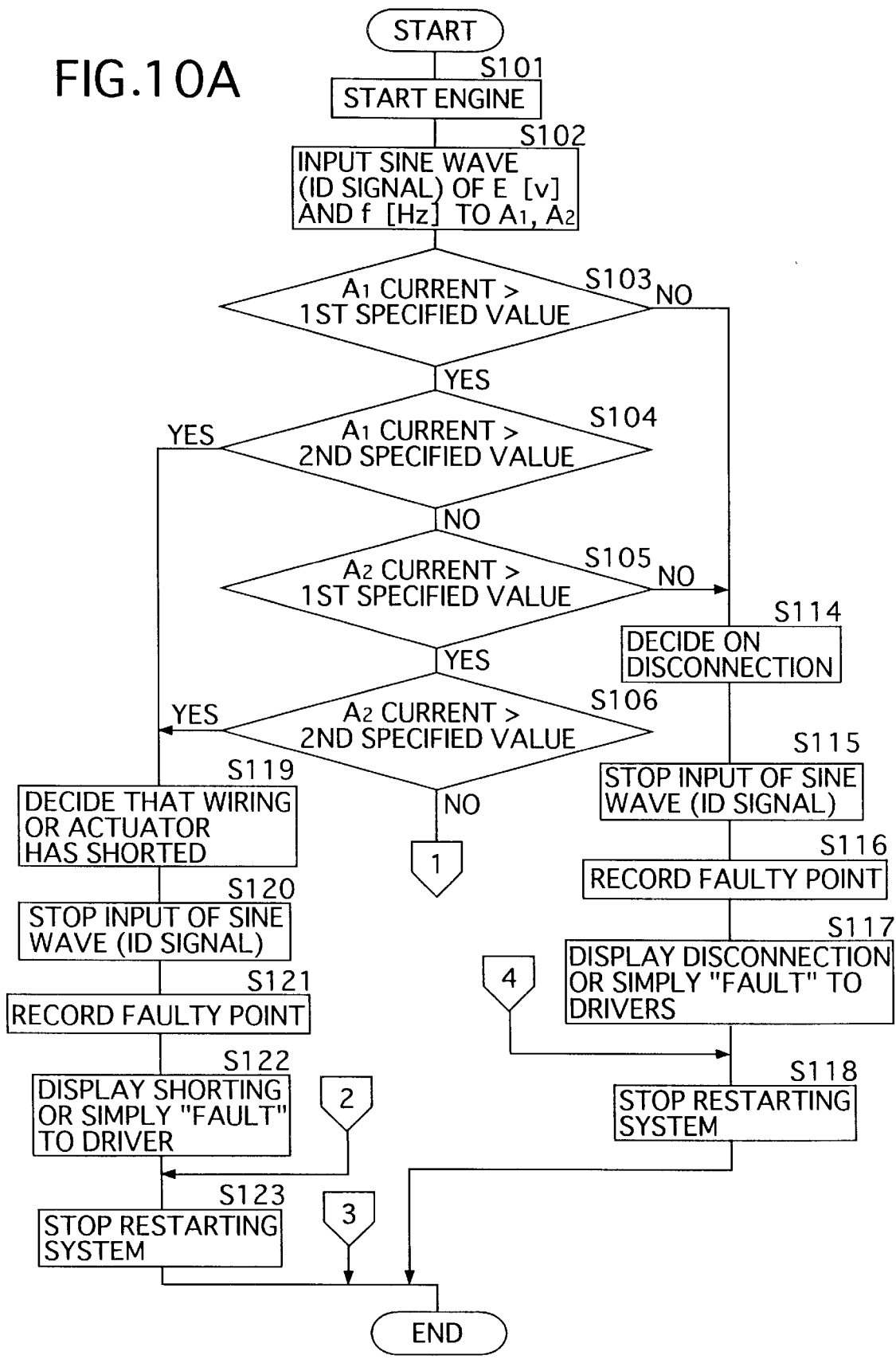
FIGS. 10A and 10B comprise a flowchart showing the steps of fault diagnosis carried out immediately after starting the engine.
Figure 10B:
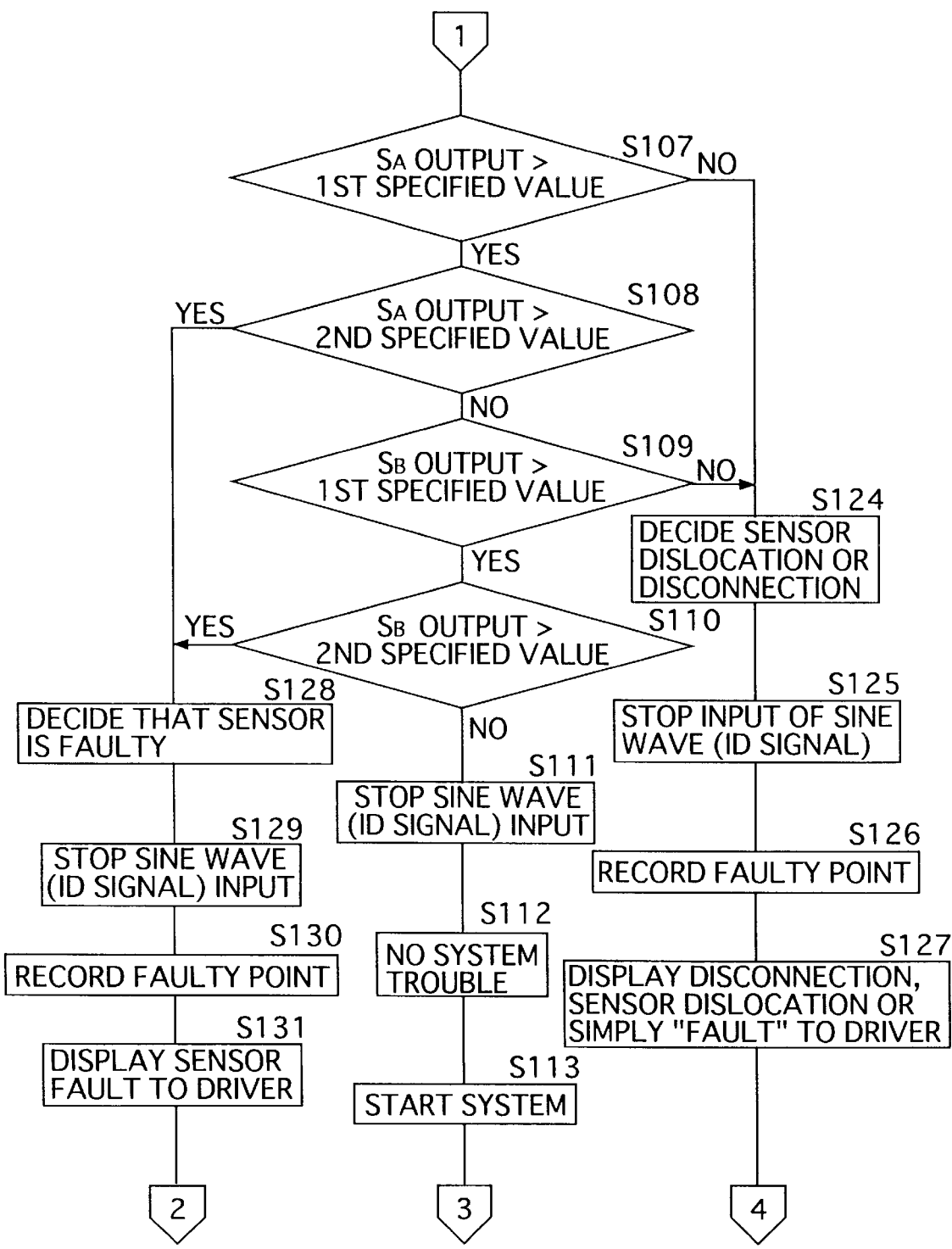

The above-mentioned embodiments can specifically estimate a faulty point of each part of the system with high accuracy. Since the fault diagnosis is carried out immediately after the system stops operating, however, it is difficult to find a fault that may occur between a system stop and the next system start. Explanation will be made below with reference to the flowchart of FIGS. 10A and 10B about a simple fault diagnosis method that can be carried out immediately after engine start and immediately before system start as a measure against the above-mentioned trouble. For facilitating the understanding, assume that the invention is applied to a system including one reference signal (identification signal), two actuators and two error detection sensors (1-2-2 system).

First, once the engine is started (step S110), the actuators $A_1$, $A_2$ are immediately vibrated at the same time (step S102) using a reference signal (identification signal) such as a sinusoidal wave signal, a random wave or a music signal of E volts and f Hz (step S102). In the process, the vibration frequency is desirably set to a value not affected by the vibrations normally input from the engine or the road surface as far as possible.

Then, the currents flowing in the actuators $A_1$, $A_2$ are measured (steps S103 to S106), and if the particular currents are within a proper range, i.e., larger than a first specified value and smaller than a second specified value set in advance, then, it is decided that the actuators $A_1$, $A_2$ are normal, followed by the next step of checking the error detection sensors $S_A$, $S_B$ (steps S107 to S110). This check is performed for each of the error detection sensors $S_A$, $S_B$. In the case where transmission forces generated by the actuators $A_1$, $A_2$ and received by the error detection sensors $S_A$, $S_B$ are within a proper range, i.e., larger than a first specified value and smaller than a second specified value, then, it is decided that the error detection sensors $S_A$, $S_B$ are also normal. Then, the input of the identification signal is stopped (step S111), followed by the decision that the system has no trouble and the system is started (steps S112, 113).

In the case where step S103 or S105 decides that the current flowing in the actuator $A_1$ or $A_2$ is excessively small, i.e., smaller than the first specified value, then it is decided that a disconnection may have occurred (step S114). The identification signal input is stopped (step S115), a faulty point is recorded in the electronic control unit ECU (step 116), and a disconnection or, simply, "a fault" is indicated to the driver by the fault display means Mo 26 (step S117). Then, the system stops being restarted (step S118). In the case where step S104 or S106 decides that the current flowing in the actuator $A_1$ or $A_2$ is excessively large, i.e., larger than the second specified value, on the other hand, then it is decided that the wiring or the actuator may have been shorted (step S119). The input of the identification signal is stopped (step S120), a faulty point is recorded in the electronic control unit ECU (step S121), and the driver is informed of a shorting or, simply, "a fault" by the fault display means Mo 26 (step S122), followed by stopping the restarting of the system (step S123).

Further, in the case where step S107 or S109 decides that the output of the error detection sensors $S_A$, $S_B$ is excessively small, i.e., smaller than the first specified value, then it is decided that the error detection sensors $S_A$, $S_B$ may have been dislocated or disconnected (step S124). The identification signal input thus is stopped (step S125), a faulty point is recorded in the electronic control unit ECU (step 126), and the driver is informed of a disconnection, a sensor dislocation or, simply, "a fault" by the fault display means Mo 26 (step S127). Then the process proceeds to step S118. In the case where the decision in step S108 or S110 is that the output of the error detection sensor $S_A$, $S_B$ is excessively large, i.e., larger than the second specified value, then, a fault is decided of a error detection sensor (step S128). The input of the identification signal is then stopped (step S129), a faulty point is recorded in the electronic control unit ECU (step S130), "a fault" of the sensor is indicated to the driver by the fault display means Mo 26 (step S131), and the process proceeds to step S123.

As described above, in the fault diagnosis technique illustrated in the flowchart of FIG. 10, all the actuators are driven by a predetermined identification signal immediately after starting the engine and immediately before starting the system, so that the fault diagnosis of the system can be performed in a simplistic and general fashion according to whether or not the currents in the actuators and the output signals of the error detection sensors are included in a predetermined proper range. In this method, a fault diagnosis is performed immediately after starting the engine, and therefore the advantage is that it can also handle a fault that occurred between a system stop due to an engine stop and the next system restart by the engine restart. In spite of this, the method is not suitable for diagnosis of a faulty point at all times, in the strict sense of the word. The fault diagnosis technique using the transmission characteristic described above (FIGS. 7A and 7B), on the other hand, has the advantage that a faulty point can be strictly estimated although the fault occurring between a system stop and the next system restart is difficult to handle. In order to solve the deficiencies of these two fault diagnosis techniques, the concurrent use of them in a single control system makes possible an accurate fault diagnosis both immediately after a system stop and immediately before a system start and therefore can positively prevent a trouble occurrence in the system.

Preferred embodiments of the invention are described above. The present invention is not limited to these embodiments, but can be variously embodied without departing from the scope of the invention. Instead of the above-mentioned embodiment in which the invention is applied to an active mount control system, for example, the invention can be embodied for any other control system comprising a plurality of actuators and a plurality of sensors in which the operation of the actuators is controlled in accordance with the output signals of the sensors.

Also, apart from the specific example of fault diagnosis described above for a very simple system (1-2-2 system) including one (1) reference signal (identification signal), two (2) actuators and two (2) sensors to simplify and facilitate the understanding of the subject, the invention is not limited to such a system but is applicable also to the fault diagnosis of a system including a greater number of actuators or error detection sensors, such as a 1-3-3 system including one reference signal (identification signal), three actuators and three sensors. In such a case, the transmission paths between actuators and the error detection sensors increase (for a total of nine paths) with the increase in the number of the actuator and the sensors. In specifying a faulty point, however, a concept similar to that of the above-mentioned embodiment is applicable. Also for the actual transmission members other than the actuators and the error detection sensors, the number of the fault diagnosis patterns increases by modeling the respective transmission paths. In such a case, however, a fault of the members other than the actuators and the error detection sensors, such as the rubber portion of the mount (the elastic support member 3), can also be diagnosed.

Further, although the above-mentioned embodiment carries out the fault diagnosis only once immediately after the engine stops (the fault diagnosis shown in FIGS. 7A and 7B) or immediately after the engine starts (the fault diagnosis shown in FIGS. 10A and 10B), an erroneous diagnosis may occur not infrequently due to incidental noises due to external disturbances or the like. In order to avoid this erroneous diagnosis and improve the detection accuracy, the fault diagnosis is desirably carried out a plurality of times immediately after every engine stop (FIGS. 7A and 7B) or immediately after every engine start (FIGS. 10A and 10B), so that only in the case where the resulting decision is a fault with a probability higher than a prescribed proportion, then a real "trouble" is decided.

As described above, according to the present invention, a fault decision is made for all the transmission paths between individual actuators and individual sensors on the basis of the transmission characteristic measurements between the individual actuators and the individual sensors. A faulty point then is estimated from the pattern of the decision result. Even in the case where any one of the actuators or sensors constituting the nucleus of the control system develops a fault, therefore, the faulty point can be identified easily and inexpensively, thereby making it possible to take a remedial measure quickly against the particular fault.

According to an aspect of the invention in particular, the measurement of the transmission characteristic is compared with a normal value and a fault decision is made on the basis of the difference. In addition, the normal value used for subsequent fault decisions is updated on the basis of the measurement determined to be normal by the previous fault decision process. Even in the case where the transmission characteristic undergoes a change under the effect of variations caused by extended use and/or deterioration of the system components, therefore, the normal value providing a reference for fault diagnosis can be automatically changed in accordance with the such variations, with the result that the reduced diagnostic accuracy which otherwise might be caused by the such variations can be effectively prevented.

Furthermore according another aspect of the invention, there is provided an active mount system for automotive vehicles, in which a faulty point is estimated when the active mounts are sufficiently warmed up and the above-mentioned transmission characteristic is settled. Therefore, a reduced diagnostic accuracy which otherwise might be caused by the temperature change of the active mounts can be effectively prevented.

Furthermore, according to still another aspect of the present invention, there is provided an active mount system for automotive vehicles, in which a faulty point is estimated when the engine or the vehicle is in a stationary state. The noises from external sources other than the noise components transmitted from the actuators can be effectively prevented from being superimposed on each error detection sensor, with the result that the reduction in the diagnostic accuracy due to the external disturbances can be effectively prevented.

What is claimed:

1. A fault diagnosis method for a control system having a plurality of actuators and a plurality of sensors in which an operation of the plurality of the actuators is controlled in accordance with output signals of the sensors, comprising the steps of, measuring a transmission characteristic in each transmission path between each of the plurality of actuators and each of the plurality of the sensors, deciding a fault for each of the transmission paths between each of the actuators and each of the sensors, and estimating a faulty point from a pattern of the results of fault decisions on the transmission paths.

2. A fault diagnosis apparatus for a control system having a plurality of actuators and a plurality of sensors in which an operation of the plurality of the actuators is controlled in accordance with output signals of the sensors, comprising, measurement means for measuring a transmission characteristic in each transmission path between each of the actuators and each of the sensors, and estimation means for deciding on a fault for each of the transmission paths between each of the actuators and each of the sensors based on the measurements of the transmission characteristics and estimating a faulty point from a pattern of the results of fault decisions on the transmission paths.

3. A fault diagnosis apparatus for a control system according to claim 2, characterized in that said estimation means compares the measurements with a predetermined normal value of the transmission characteristic, decides on a fault based on difference between the measurements and the predetermined normal value and updates the normal value used for subsequent fault decisions on the basis of the measurements decided to be normal by said fault decision.

4. A fault diagnosis apparatus for a control system according to claim 2 or 3, characterized in that said control system includes a plurality of active mounts for actively reducing vibrations exerted from an engine on a vehicle body using the actuators, and a plurality of error sensors installed at a plurality of portions of the vehicle body for detecting vehicle body vibrations, means for determining when the active mounts are in a warmed state, and said estimation means being adapted to estimate a faulty point in case where the active mounts are in a sufficiently warmed state.

5. A fault diagnosis apparatus for a control system according to claim 2 or 3, characterized in that said control system includes a plurality of active mounts for actively reducing vibrations exerted from an engine on a vehicle body using the actuators, and a plurality of error sensors installed at a plurality of portions of the vehicle body for detecting vehicle body vibrations, said estimation means being adapted to estimate a faulty point in a case where one of either the engine or the vehicle body is in a stationary state.

6. A fault diagnosis apparatus for a control system according to claim 4, characterized in that means are provided for separately determining a stationary state of the engine and the vehicle, and said estimation means being adapted to estimate a faulty point in a case where one of either engine or the vehicle body is in the determined stationary state.

7. A fault diagnosis method for a control system according to claim 1, including the steps of comparing the measurements of the transmission characteristics with a predetermined normal value of the transmission characteristic, deciding on a fault based on a difference between the measured and a predetermined normal value of the transmission characteristics and updating the predetermined normal value used for subsequent fault decisions on the basis of the measurements decided to be substantially equal to the predetermined normal value by said fault decision.

8. A fault diagnosis method for a control system according to claim 1 or 7, characterized in that said control system includes a plurality of active mounts for actively reducing a vibration exerted from an engine on a vehicle body using the actuators, and a plurality of error sensors installed at a plurality portions of vehicle body and capable of detecting the vehicle body vibrations, the method including the steps of determining when the active mounts are in a warmed state, and estimating a faulty point in the case where the active mounts are in a sufficiently warmed state.

9. A fault diagnosis method for a control system according to claim 1 or 7, characterized in that said control system includes a plurality of active mounts for actively reducing vibrations exerted from an engine on a vehicle body using the actuators, and a plurality of error sensors installed at a plurality of portions of the vehicle body and capable of detecting vehicle body vibrations, the method including the steps of determining when the engine and the vehicle body, respectively, are in a stationary state, and estimating a faulty point in a case where one of either the engine or the vehicle is in the stationary state.

10. A fault diagnosis method for a control system according to claim 1, wherein said step of estimating a faulty point is conducted by specifying at least one of said actuators and said sensors which are commonly associated with at least two of said transmission paths that have been decided to be faulty.

11. A fault diagnosis apparatus for a control system according to claim 2, wherein said estimation means estimates said faulty point on at least one of said actuators and said sensors which are commonly associated with at least two of said transmission paths that have been decided to be faulty.

* * * * *